US012647241B2

(12) United States Patent
Abdelghaffar et al.

(10) Patent No.: US 12,647,241 B2
(45) Date of Patent: Jun. 2, 2026

(54) DOWNLINK RECEPTION IN AN UPLINK SUBBAND

(71) Applicant: QUALCOMM Incorporated, San Diego, CA (US)

(72) Inventors: Muhammad Sayed Khairy Abdelghaffar, San Jose, CA (US); Qian Zhang, Basking Ridge, NJ (US); Abdelrahman Mohamed Ahmed Mohamed Ibrahim, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 18/365,858

(22) Filed: Aug. 4, 2023

(65) Prior Publication Data

US 2024/0113846 A1     Apr. 4, 2024

Related U.S. Application Data

(60) Provisional application No. 63/377,963, filed on Sep. 30, 2022.

(51) Int. Cl.
H04L 5/14 (2006.01)
H04W 72/1273 (2023.01)
H04W 72/232 (2023.01)

(52) U.S. Cl.
CPC ........... H04L 5/14 (2013.01); H04W 72/1273 (2013.01); H04W 72/232 (2023.01)

(58) Field of Classification Search
CPC .... H04L 5/14; H04W 72/1273; H04W 72/232
USPC ......................................................... 370/277
See application file for complete search history.

(56) References Cited

U.S. PATENT DOCUMENTS

| | | | | |
|---|---|---|---|---|
| 12,446,114 B2* | 10/2025 | Sun | ...................... | H04W 88/06 |
| 2021/0337489 A1 | 10/2021 | Abotabl et al. | | |
| 2022/0014298 A1 | 1/2022 | Ibrahim et al. | | |
| 2022/0360360 A1* | 11/2022 | Awadin | ................... | H04W 8/24 |
| 2024/0049130 A1* | 2/2024 | Lee | .................. | H04W 52/0216 |
| 2024/0057191 A1* | 2/2024 | Chen | ..................... | H04W 76/19 |
| 2024/0063992 A1* | 2/2024 | Esswie | ............. | H04W 72/1273 |
| 2024/0080132 A1* | 3/2024 | Atawia | ................. | H04L 5/0094 |
| 2025/0365122 A1* | 11/2025 | Jung | .................. | H04B 17/345 |
| 2026/0025249 A1* | 1/2026 | Jung | .................... | H04L 5/0053 |

OTHER PUBLICATIONS

International Search Report and Written Opinion—PCT/US2023/071786—ISA/EPO—Dec. 11, 2023.
(Continued)

*Primary Examiner* — Peter G Solinsky
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information associated with downlink reception in an uplink subband corresponding to a subband full duplex (SBFD)-aware configuration. The UE may receive a downlink communication in the uplink subband based on the configuration information. Numerous other aspects are described.

30 Claims, 11 Drawing Sheets

900 ➔

910 〜 Transmit configuration information associated with downlink reception in an uplink subband corresponding to a subband full duplex (SBFD)-aware configuration 920 〜 Transmit a downlink communication in the uplink subband based on the configuration information

(56) References Cited

OTHER PUBLICATIONS

Qualcomm Incorporated: "Feasibility and Techniques for Subband Non-overlapping Full Duplex", 3GPP TSG RAN WG1, Meeting #113, R1-2305335, 3rd Generation Partnership Project, Mobile Competence Centre, 650, Route Des Lucioles, F-06921 Sophia-Antipolis Cedex, France vol. RAN WG1, No. Incheon, Korea, May 22, 2023-May 26, 2023, May 21, 2023, XP052394169, Sect. 3.4.1, 68 Pages.

Samsung: "Subband Non-overlapping Full Duplex for NR Duplex Evolution", R1-2203904, 3rd Generation Partnership Project, Mobile Competence Centre, 650, Route Des Lucioles, F-06921 Sophia-antipolis Cedex, France, vol. RAN WG1, No. e -Meeting, May 9, 2022-May 20, 2022 Apr. 29, 2022, XP052153242, 3GPP TSG-RAN WG1 Meeting #109-e e-Meeting, May 9-20, 2022, 15 Pages, Sect. 4: CLI, p. 11, Figure 8.

* cited by examiner

810   Receive configuration information associated with downlink reception in an uplink subband corresponding to a subband full duplex (SBFD)-aware configuration 820   Receive a downlink communication in the uplink subband based on the configuration information

800

910 Transmit configuration information associated with downlink reception in an uplink subband corresponding to a subband full duplex (SBFD)-aware configuration 920 Transmit a downlink communication in the uplink subband based on the configuration information

900

DOWNLINK RECEPTION IN AN UPLINK SUBBAND

CROSS-REFERENCE TO RELATED APPLICATION

This patent application claims priority to U.S. Provisional Patent Application No. 63/377,963, filed on Sep. 30, 2022, entitled "DOWNLINK RECEPTION IN AN UPLINK SUBBAND," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for downlink reception in an uplink subband.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include one or more memories and one or more processors coupled to the one or more memories. The one or more processors may be configured to cause the UE to receive configuration information associated with downlink reception in an uplink subband corresponding to a subband full duplex (SBFD)-aware configuration. The one or more processors may be configured to cause the UE to receive a downlink communication in the uplink subband based on the configuration information.

Some aspects described herein relate to a network node for wireless communication. The network node may include one or more memories and one or more processors coupled to the one or more memories. The one or more processors may be configured to cause the network node to transmit configuration information associated with downlink reception in an uplink subband corresponding to an SBFD-aware configuration. The one or more processors may be configured to cause the network node to transmit a downlink communication in the uplink subband based on the configuration information.

Some aspects described herein relate to a method of wireless communication performed by an apparatus at a UE. The method may include receiving configuration information associated with downlink reception in an uplink subband corresponding to an SBFD-aware configuration. The method may include receiving a downlink communication in the uplink subband based on the configuration information.

Some aspects described herein relate to a method of wireless communication performed by an apparatus at a network node. The method may include transmitting configuration information associated with downlink reception in an uplink subband corresponding to an SBFD-aware configuration. The method may include transmitting a downlink communication in the uplink subband based on the configuration information.

Some aspects described herein relate to a non-transitory computer-readable medium that stores a set of instructions for wireless communication by a UE. The set of instructions, when executed by one or more processors of the UE, may cause the UE to receive configuration information associated with downlink reception in an uplink subband corresponding to an SBFD-aware configuration. The set of instructions, when executed by one or more processors of the UE, may cause the UE to receive a downlink communication in the uplink subband based on the configuration information.

Some aspects described herein relate to a non-transitory computer-readable medium that stores a set of instructions for wireless communication by a network node. The set of instructions, when executed by one or more processors of the network node, may cause the network node to transmit configuration information associated with downlink reception in an uplink subband corresponding to an SBFD-aware configuration. The set of instructions, when executed by one or more processors of the network node, may cause the network node to transmit a downlink communication in the uplink subband based on the configuration information.

Some aspects described herein relate to an apparatus for wireless communication. The apparatus may include means for receiving configuration information associated with downlink reception in an uplink subband corresponding to an SBFD-aware configuration. The apparatus may include means for receiving a downlink communication in the uplink subband based on the configuration information.

Some aspects described herein relate to an apparatus for wireless communication. The apparatus may include means for transmitting configuration information associated with downlink reception in an uplink subband corresponding to an SBFD-aware configuration. The apparatus may include means for transmitting a downlink communication in the uplink subband based on the configuration information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
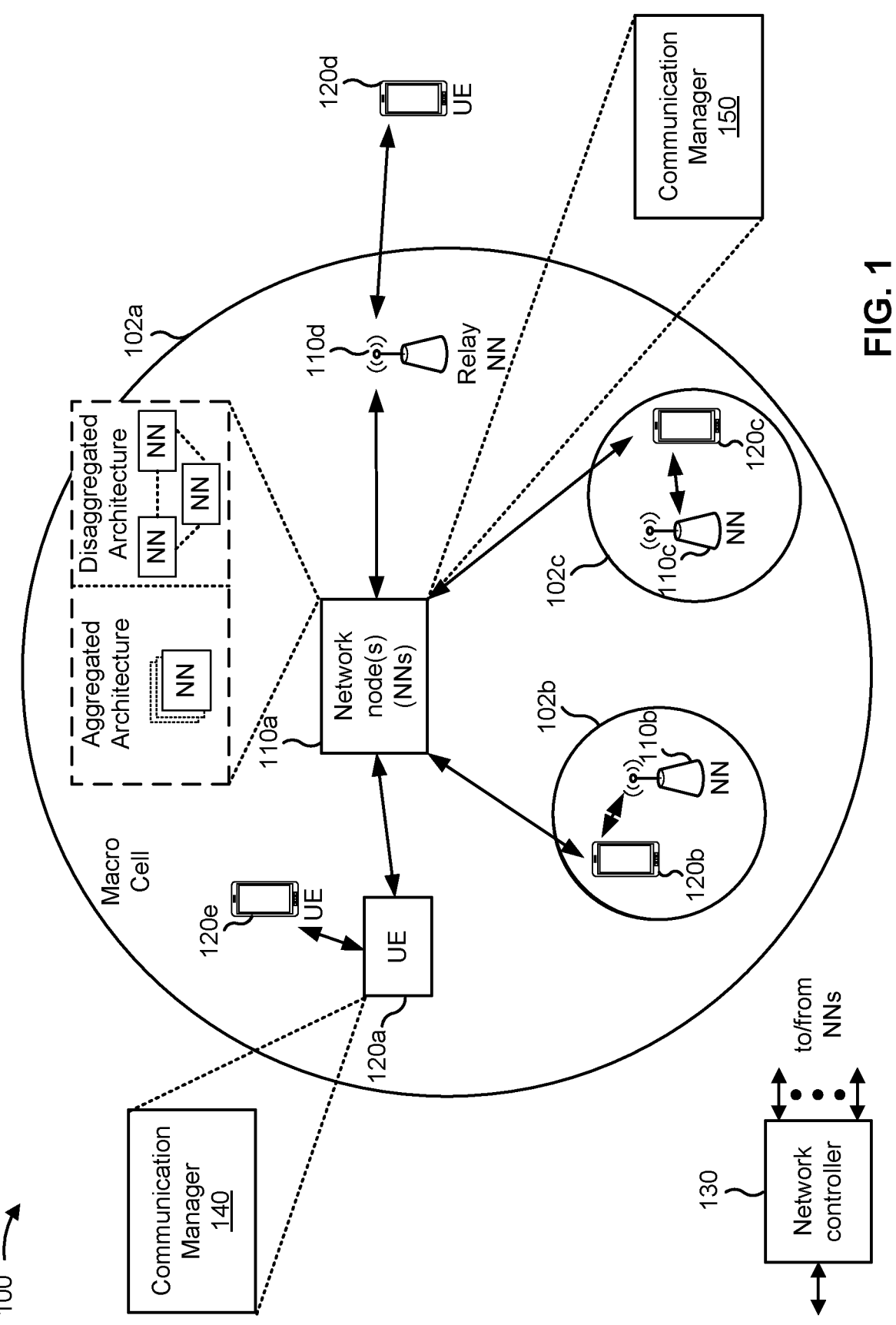
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells.

In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive configuration information associated with downlink reception in an uplink subband corresponding to a subband full duplex (SBFD)-aware configuration; and receive a downlink communication in the uplink subband based on the configuration information. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit configuration information associated with downlink reception in an uplink subband corresponding to an SBFD-aware configuration; and transmit a downlink communication in the uplink subband based on the configuration information. Additionally, or alternatively, the communication manager 150 may perform one or more other operations described herein.

As indicated above, FIG. 1 is provided as an example. Other examples may differ from what is described with regard to FIG. 1.

Figure 2:
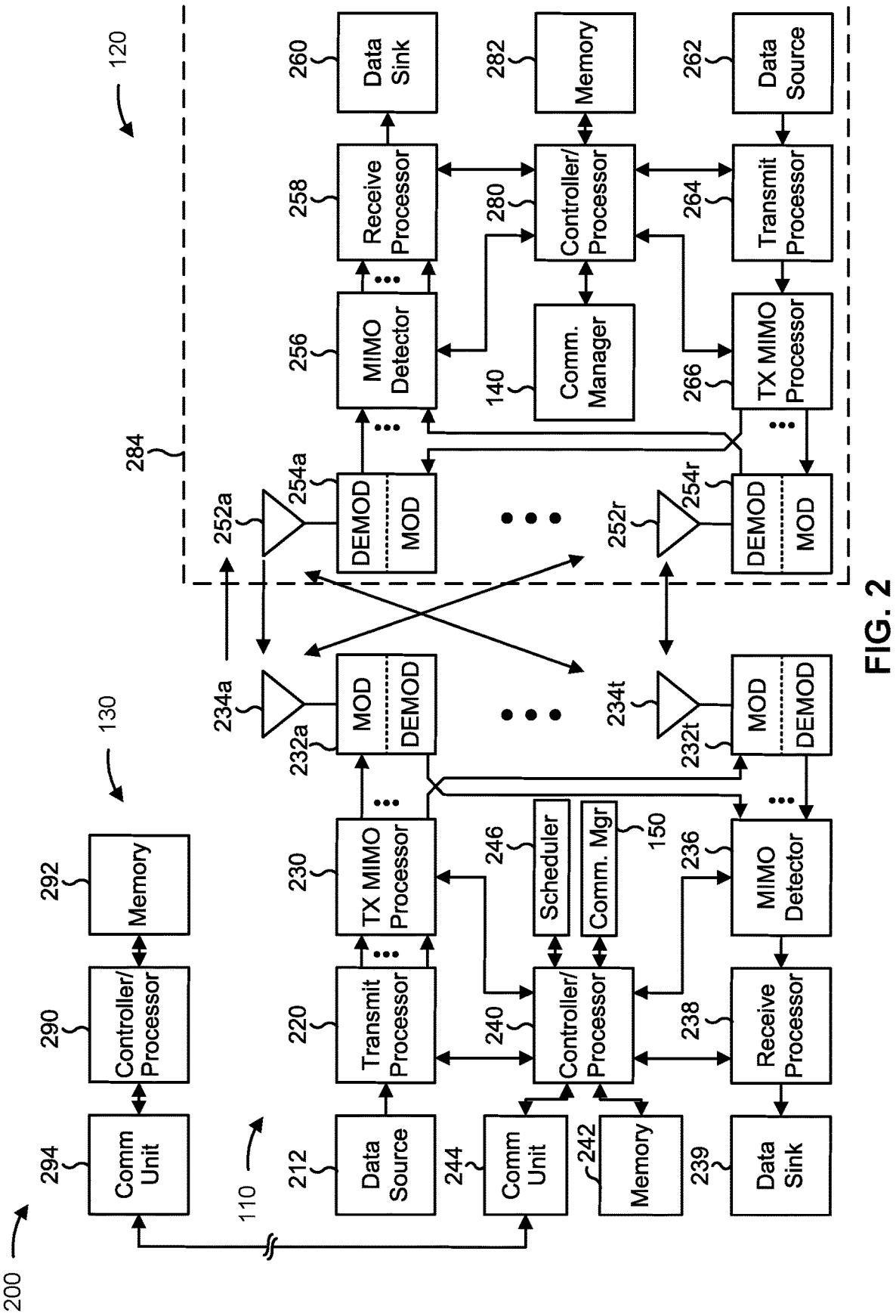
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a network node, such as for millimeter wave communications and/or the like. In such a case, the network node may provide the UE with a configuration of transmission configuration indicator (TCI) states that respectively indicate beams that may be used by the UE, such as for receiving a physical downlink shared channel (PDSCH). The network node may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, and/or any other component(s) of FIG. 2 may perform one or more techniques associated with downlink reception in an uplink subband, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving configuration information associated with downlink reception in an uplink subband corresponding to an SBFD-aware configuration; and/or means for receiving a downlink communication in that uplink subband based on the configuration information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting configuration information associated with downlink reception in an uplink subband corresponding to an SBFD-aware configuration; and/or means for transmitting a downlink communication in the uplink subband based on the configuration information. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
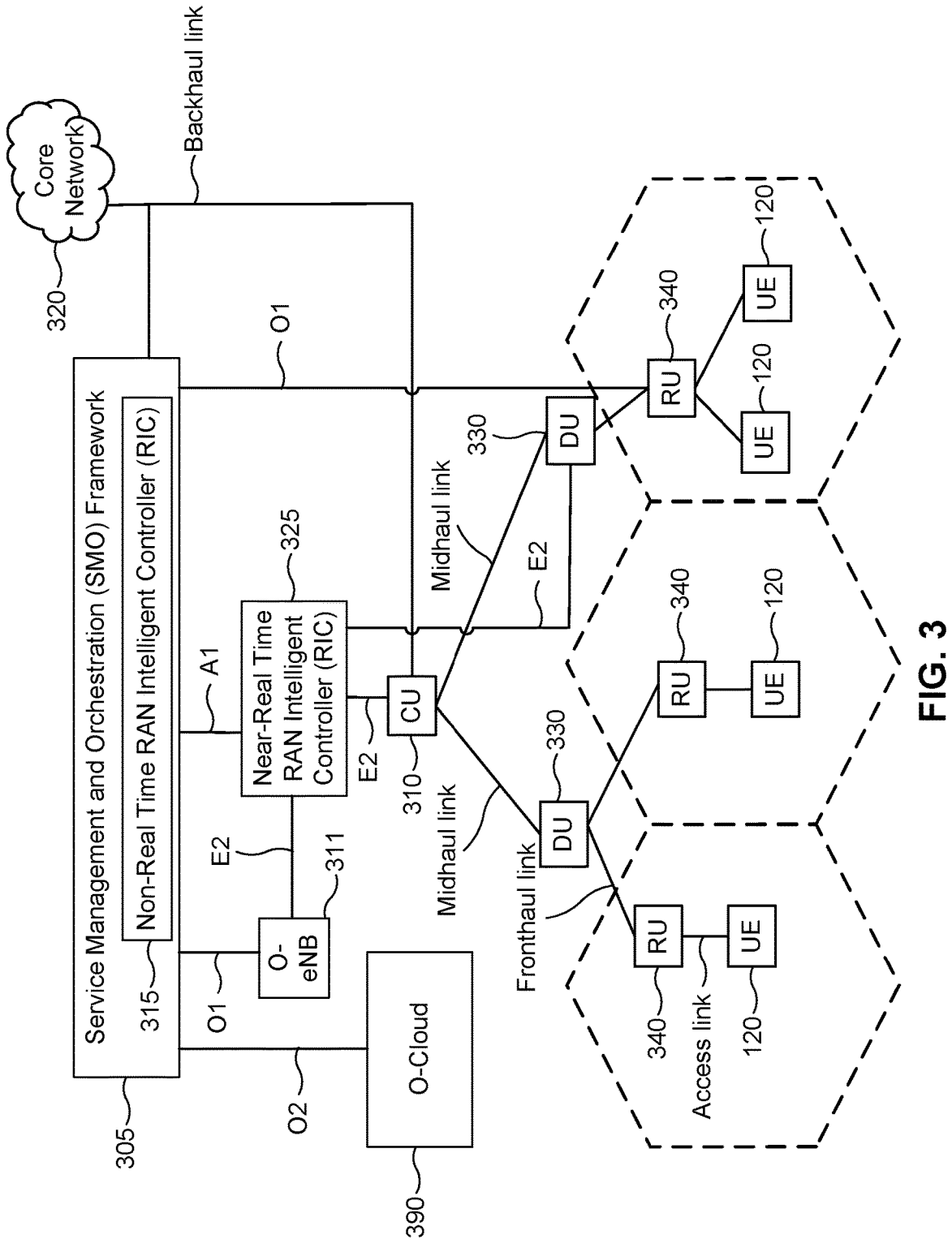
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIGS. 4A-4D are diagrams illustrating examples 400, 410, 420, 430 of full duplex (FD) communication in accordance with the present disclosure. An FD communication is a communication that utilizes overlapped time resources at a single node (such as a UE or a base station) for transmission and reception. For example, a UE or a network node may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different TCI states defining different beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a QCL type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG).

Figures 4A, 4B, 4C, 4D:
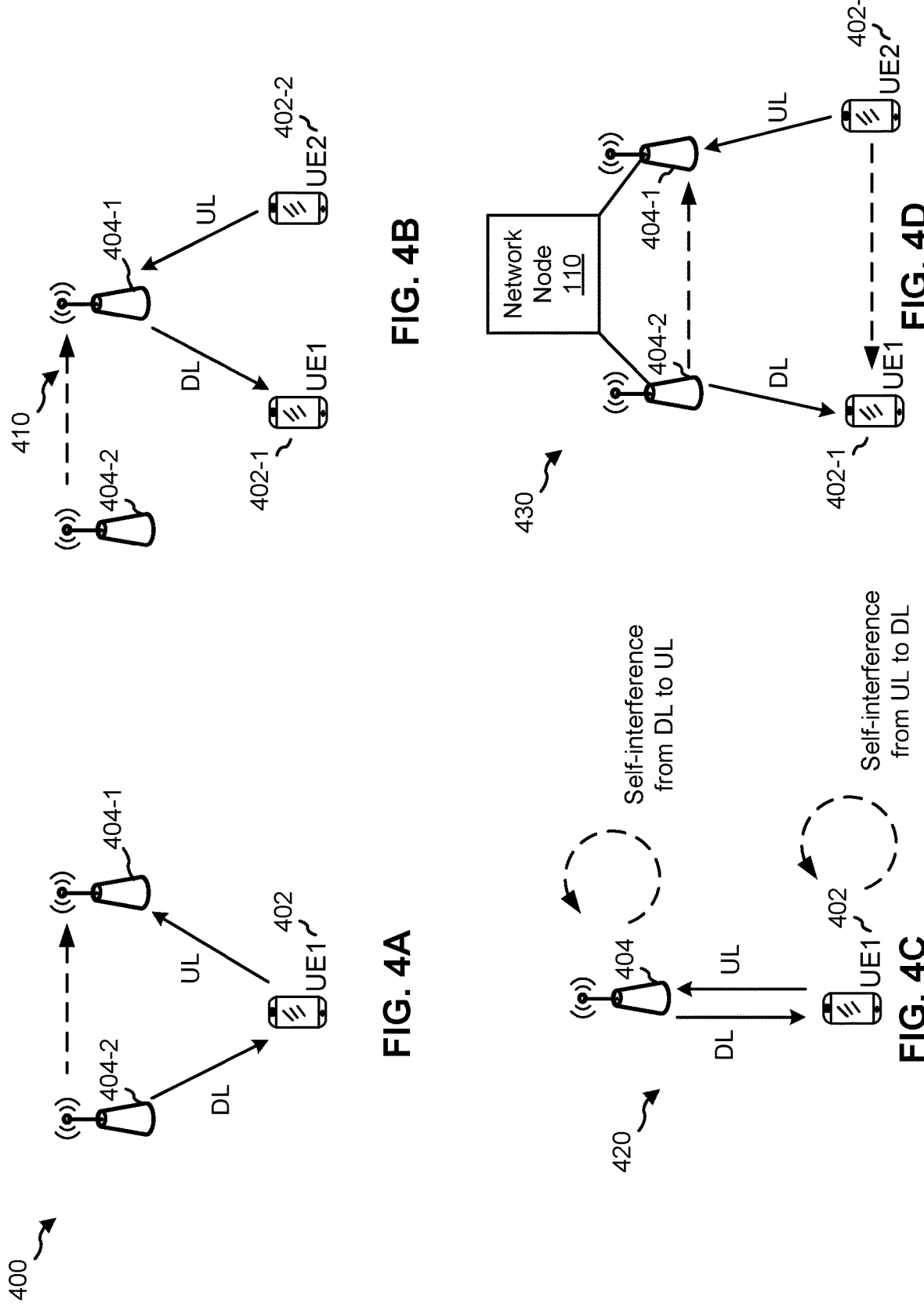
FIGS. 4A-4D are diagrams illustrating examples of full duplex (FD) communication in accordance with the present disclosure.

The example 400 of FIG. 4A includes a UE1 402 and two network nodes (e.g., TRPs) 404-1, 404-2, wherein the UE1 402 is sending uplink transmissions to the network node 404-1 and is receiving downlink transmissions from the network node 404-2. In some aspects, the network node 404 described in connection with FIG. 4 may be a base station, a TRP associated with (e.g., managed by) a network node, an RU, a DU, or a similar network node. In some aspects, the UEs 402 described in connection with FIG. 4 may be the UE 120 described in connection with FIGS. 1, 2, and 3, or a similar UE. In the example 400 of FIG. 4A, FD is enabled for the UE1 402, but not for the network nodes 404-1, 404-2. Thus, the network nodes 404-1 and 404-2 are half duplex (HD) network nodes.

The example 410 of FIG. 4B includes two UEs, UE1 402-1 and UE2 402-2, a network node 404-1, and a network node 404-2. The UE1 402-1 is receiving a downlink transmission from the network node 404-1 and the UE2 402-2 is transmitting an uplink transmission to the network node 404-1. In the example 410 of FIG. 4B, FD is enabled for the network node 404-1, but not for the UE1 402-1 and UE2 402-2. Thus, the UE1 402-1 and UE2 402-2 are half duplex UEs.

The example 420 of FIG. 4C includes a UE1 402 and a network node 404, wherein the UE1 402 is receiving a downlink transmission from the network node 404 and the UE1 402 is transmitting an uplink transmission to the network node 404. In the example 420 of FIG. 4C, FD is enabled for both the UE1 402 and the network node 404. In the example 420 of FIG. 4C, the UE1 402 and the network node 404 communicate using a beam pair. A beam pair may include a downlink beam and an uplink beam. For example, a UE1 402 may use a beam pair that includes a downlink beam (that is, a receive beam) at the UE1 402 and an uplink beam (that is, a transmit beam) at the UE1 402 to communicate with the network node 404. The network node 404 may use a downlink beam (that is, a transmit beam) at the network node 404 to transmit communications received via the UE1 402's downlink beam, and may use an uplink beam (that is, a receive beam) at the network node 404 to receive communications transmitted via the UE1 402's uplink beam.

The example 430 of FIG. 4C includes a network node 110 and two network nodes 404-1 and 404-2 associated with a cell (such as, e.g., a cell 102 described in connection with FIG. 1). The network nodes 404-1 and 404-2 may be either co-located (e.g., located at the same device, such as at the network node 110 or other device), or may be non-co-located (e.g., located apart from one another and/or from the network node 110, and thus may be standalone devices).

In FIGS. 4A-4D, examples of interference are indicated by dashed lines. Interference can occur between network nodes of examples 400, 410, 420, 430 (referred to as cross-link interference (CLI)). In FIG. 4A, network node 404-2's downlink transmission interferes with network node

404-1's uplink transmission. In FIG. 4B, network node 404-1's uplink reception may be subject to interference from a transmission by a network node 404-2. CLI between network nodes 404 is referred to herein as inter-network node CLI. In some examples in FIG. 4B, UE2 402-2's uplink transmission may interfere with UE1 402-1's downlink transmission (not shown). Similarly, in FIG. 4D, UE2 402-2's uplink transmission interferes with UE1 402-1's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 402 (from an uplink transmission to a downlink reception) and at a network node 404 (from a downlink transmission to an uplink reception) are shown in FIG. 4C. It should be noted that the above-described CLI and self-interference conditions can occur in HD deployments and in FD deployments.

Some network nodes support SBFD communication, as described below. SBFD communication may involve the configuration of certain resources as having an SBFD format.

As indicated above, FIGS. 4A-4D are provided as one or more examples. Other examples may differ from what is described with regard to FIGS. 4A-4D.

Figure 5:
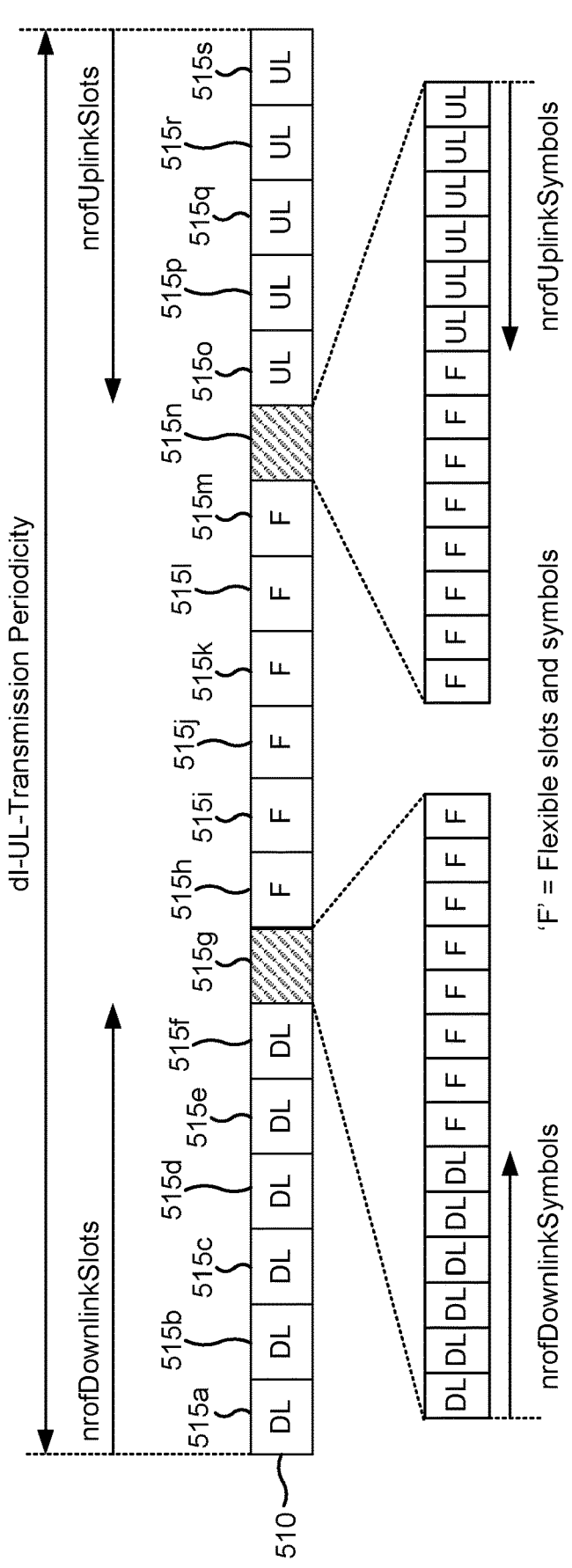
FIG. 5 is a diagram illustrating an example of a slot format used to schedule UE communications, in accordance with the present disclosure.

FIG. 5 is a diagram illustrating an example 500 of a slot format used to schedule UE communications, in accordance with the present disclosure. As described above, a transmission timeline may be organized into radio frames, subframes, slots, and symbols. However, for ease of description, only the slot and symbol granularity are depicted in FIG. 5. Example 500 shows how time division duplexed (TDD) slots (e.g., slots on a TDD carrier) can be configured as usable for uplink and/or downlink communication using a combination of semi-static and dynamic signaling.

A timeline of slots is shown by reference number 510, which includes a number of slots 515a-515s. Each slot 515 and/or portions thereof (e.g., symbols) may be scheduled and/or configured for use for an uplink ("UL") communication, a downlink ("DL") communication, or as flexible ("F"). A flexible slot (e.g., 515h-515m) may be used for either an uplink communication or a downlink communication. A resource configured and/or scheduled for use for an uplink communication is described herein as having an uplink (U) format. A resource configured and/or scheduled for use for a downlink communication is described herein as having a downlink (D) format. A resource configured and/or scheduled to include only flexible resources is described herein as having a flexible (F) format. All symbols within each slot may all be assigned alike (e.g., all "UL," all "DL," or all "F"), or else the slot may include multiple symbol assignment types. For example, in FIG. 5, slots 515a-515f (denoted by "nrofDownlinkSlots") are depicted as downlink slots without showing the symbol granularity because all symbols in each of those slots are configured as downlink symbols. Similarly, slots 515o-515s (denoted by "nrofUplinkSlots") are depicted as uplink slots without showing the symbol granularity because all symbols in each of those slots are configured as uplink symbols. In this regard, "nrofDownlinkSlots" refers to the number of consecutive full DL slots (e.g., slots including only DL symbols) at the beginning of each timeline of slots 510 (e.g., slots 515a-515f), and "nrofUplinkSlots" refers to the number of consecutive full UL slots (e.g., slots including only UL symbols) at the end of each timeline of slots 510 (e.g., slots 515*o*-515*s*).

Slots 515*g* and 515*n* include more than one format of symbols. More particularly, slot 515*g* includes six downlink symbols (denoted by "nrofDownlinkSymbols"), with the remaining eight symbols being flexible and thus available for uplink or downlink, for a total of fourteen symbols. Slot 515*n* includes six uplink symbols (denoted by "nrofU-plinkSymbols"), with the remaining eight symbols being flexible and thus available for uplink or downlink, again for a total of fourteen symbols. In this regard, "nrofDownlinkS-ymbols" refers to the number of consecutive DL symbols in the beginning of the slot 515*g* following the last full DL slot 515*f*; and "nrofUplinkSymbols" refers to the number of consecutive UL symbols in the end of the slot 515*n* preced-ing the first full UL slot 515*o*. The remaining slots in the timeline of slots 510 (e.g., slots 515*h*-515*m*) are flexible (e.g., full flexible, with all symbols in these slots being configured as flexible symbols), and thus available for uplink and downlink communication.

Resources (e.g., slots and/or symbols) semi-statically configured as flexible may be later reconfigured for use for uplink or downlink communication. In some aspects, a common configuration parameter (e.g., tdd-UL-DL-Con-figurationCommon or similar) transmitted to all UEs in a cell defines a semi-static slot and/or symbol structure, including designating certain slots or symbols for use in uplink communication, downlink communication, or as flexible for use in either uplink or downlink communication. For example, the common configuration parameter may semi-statically configure slots and symbols to have an initial configuration as shown in FIG. 5. A dedicated configuration parameter (e.g., tdd-UL-DL-ConfigurationDedicated), which can be transmitted to a specific UE via a slot format indicator (SFI), may then be used to reconfigure the flexible slots and symbols as uplink or downlink slots and symbols. In some cases, for a remaining flexible slot or symbol (e.g., slots or symbols still configured as flexible after the recon-figuration due to the dedicated configuration parameter), the UE may monitor for physical downlink control channel (PDCCH) information, and determine whether a flexible slot or symbol should be configured as an uplink slot or symbol or a downlink slot or symbol based at least in part on an uplink and/or downlink resource allocation indicated by the PDCCH information. In some cases, the flexible slots or symbols may be dynamically changed by the network node via a DCI message or a similar message (which may be referred to as a UE-dedicated configuration).

Resources (e.g., slots and/or symbols) can be configured to have an SBFD format. A resource having an SBFD format includes one or more SBFD symbols. An SBFD symbol is a symbol with one or more sub-bands (referred to herein as SBFD sub-bands) that a network node (such as a gNB) can use or will use for SBFD operation. For SBFD operation within a TDD carrier, an SBFD sub-band may include 1 resource block, or a set of consecutive resource blocks, for a same transmission direction. In some aspects, for SBFD operation within a TDD carrier, an SBFD sub-band consists of 1 resource block, or a set of consecutive resource blocks, for a same transmission direction. In some aspects, "SBFD symbols" are defined as symbols with subbands that a gNB would use for SBFD operation. In some aspects, for SBFD operation within a TDD carrier, an SBFD subband consists of 1 resource block (RB) or a set of consecutive RBs for the same transmission direction. Additional description of SBFD resources is provided in connection with FIG. 6.

As indicated above, FIG. 5 is provided as an example. Other examples may differ from what is described with regard to FIG. 5.

Figure 6:
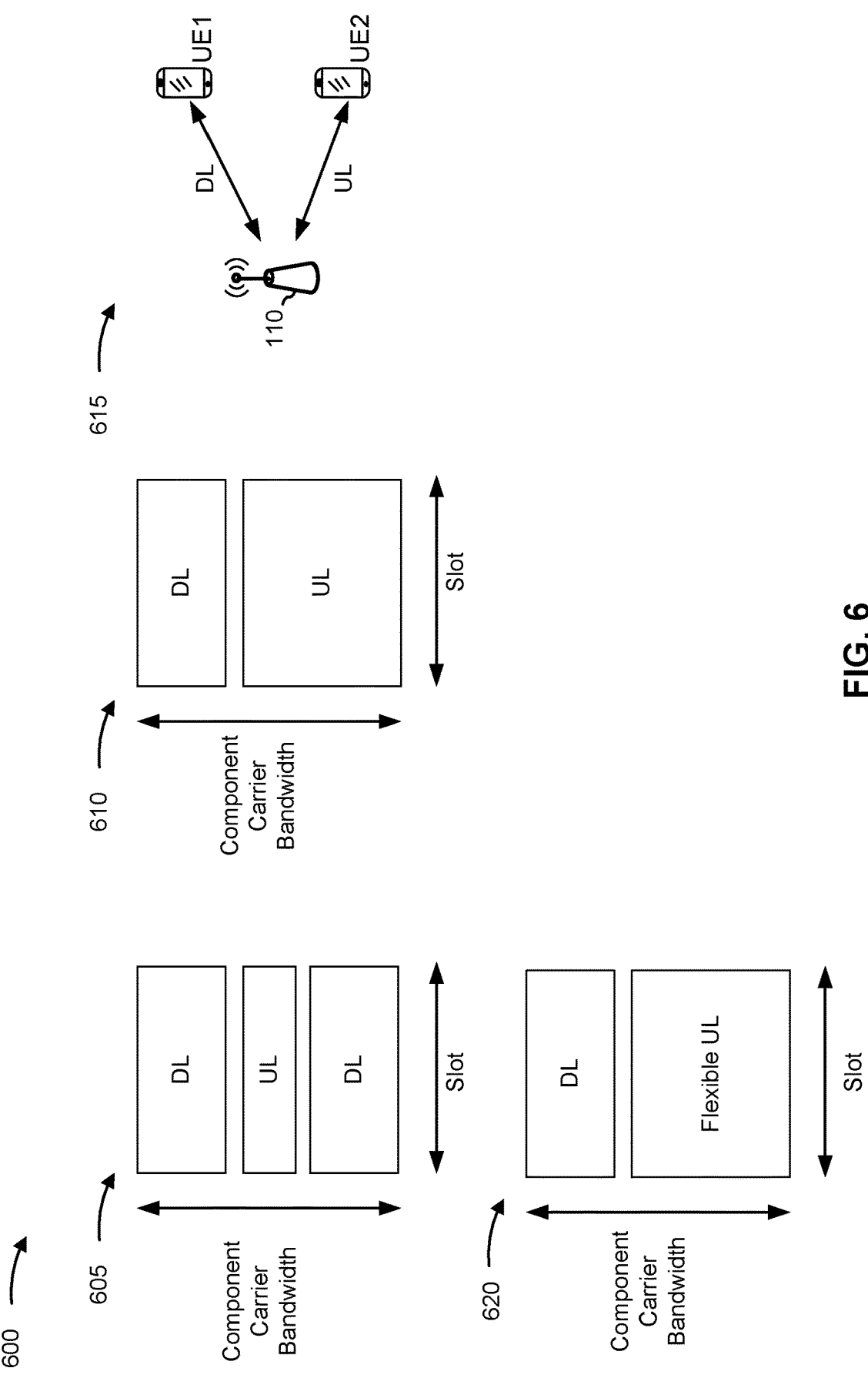
FIG. 6 is a diagram illustrating an example of subband full duplex (SBFD) resources and communication, in accordance with the present disclosure.

FIG. 6 is a diagram illustrating an example 600 of SBFD resources and communication, in accordance with the pres-ent disclosure. FIG. 6 shows examples 605, 610, and 620 of SBFD resources, and an example 615 of a communication configuration between a network node 110 and UEs 1 and 2 (e.g., UEs 120) using an SBFD configuration.

An SBFD resource (that is, a resource having an SBFD format) may include one or more symbols and/or one or more slots. As mentioned above, an SBFD resource may include at least one uplink sub-band (that is, a sub-band used for uplink communication by a UE) and at least one down-link sub-band (that is, a sub-band used for downlink com-munication by a UE). Example 605 includes two non-contiguous downlink sub-bands and one uplink sub-band. Example 610 includes one downlink sub-band and one uplink sub-band. The two downlink sub-bands of example 605 may be used by a single UE, or may be used by different UEs (e.g., a first UE for a first downlink sub-band and a second UE for a second downlink sub-band). As mentioned above, a sub-band may include one or multiple consecutive resource blocks associated with a transmission direction. Here, example 605 includes two sub-bands associated with a downlink transmission direction and one sub-band asso-ciated with an uplink transmission direction, and example 610 includes one sub-band associated with a downlink transmission direction and one sub-band associated with an uplink transmission direction. Examples 605 and 610 may illustrate a symbol having an SBFD format (e.g., a symbol in which there is a set of resource blocks comprising at least one downlink sub-band and a set of resource blocks com-prising at least one uplink sub-band), a slot having an SBFD format (e.g., a slot in which there is at least one downlink sub-band and at least one uplink sub-band), or another time resource having an SBFD format.

In a resource with an SBFD format, a network node 110 may perform simultaneous transmission of downlink trans-missions and reception of uplink transmissions on a sub-band basis. For example, the network node 110 may simul-taneously communicate with UE1 on the downlink and UE2 on the uplink. In some examples, UE1 and/or UE2 may be configured with only the sub-band(s) in use by UE1 and/or UE2 for communication. For example, UE1 may be config-ured with only downlink sub-bands, and UE2 may be configured with only uplink sub-bands of an SBFD format-ted resource. This may be because, for example, UE1 and/or UE2 do not have a capability for SBFD communication. In some examples, UE1 and/or UE2 may be configured to utilize an SBFD formatted resource. For example, if a UE has a capability for SBFD communication, the UE may be aware that a given resource has an SBFD format (while utilizing the resource in only one transmission direction), or may perform FD communication in the given resource.

A resource can be configured to an SBFD format. In some aspects, a resource may be configured to an SBFD format based at least in part on an indication of a change of a format of the resource. For example, a network node may provide signaling indicating that the format of the resource is selected as an SBFD format (similarly to how signaling may indicate that the format is an uplink format, a downlink format, or a flexible format). As another example, a network node may configure one or more sub-bands of the resource such that the resource includes at least one uplink sub-band and at least one downlink sub-band. For example, a network node may reconfigure a sub-band of a slot with a downlink format to be an uplink sub-band, thereby converting the slot to have an SBFD format.

Example 620 shows a downlink subband and an uplink subband. In some cases, a UE can use the uplink subband for uplink transmissions, but may not be scheduled to receive downlink communications in the uplink subband. However, in some cases, a UE can benefit from being able to receive downlink communications in an uplink subband such as, for example, to receive certain types of downlink communications in more than one subband simultaneously and/or for measuring CLI.

Some aspects of the techniques and apparatuses described herein may facilitate downlink reception in an uplink subband. In some aspects, the uplink subband may be a flexible uplink subband. For example, in some aspects, downlink reception may be provided for downlink scheduling of physical downlink shared channel (PDSCH) communications, channel state information reference signals (CSI-RSs), and/or physical downlink control channel (PDCCH) communications. In some aspects, downlink reception in an uplink subband may be provided for facilitating CLI measurements.

In some aspects, rules may be defined related to what type of signals/channels can be received in an uplink subband. For example, in some aspects, only dynamic communications scheduled by DCI may be received in an uplink subband, while RRC configured downlink communications may be skipped based on having a lower priority level. In some aspects, if the UE has a downlink subband RF filter and needs to tune the downlink RF filter (e.g. with D/U subband configuration) or if the UE needs to retune the RF frequency, then a scheduling offset associated with a network node scheduling downlink reception within an uplink subband in a SBFD symbol may be long enough to guarantee enough time for the UE to retune RF retuning and/or a downlink subband filter.

In some aspects, an SBFD-aware UE may perform downlink reception in an uplink subband for inter-UE CLI measurements within the uplink subband and/or dynamic downlink scheduled PDSCH or CSI-RS. In some aspects, downlink reception configured by higher layers (e.g. PDCCH, semi-persistent scheduling (SPS), periodic or semi-periodic CSI-RS) in an uplink subband may be skipped or dropped except, for example, in a case in which the network node indicates to the UE that the symbols for RRC downlink reception are switched from SBFD symbols to DL-only symbols. In some aspects, the UE may not expect to be configured with a search space monitoring occasion where the associated control resource set (CORESET) overlaps with the uplink subband. In some aspects, the UE may not receive PDCCH where the CORESET associated with a synchronization symbol overlaps with the uplink subband.

For downlink PDSCH reception and/or downlink aperiodic CSI-RS reception within the uplink subband, the scheduling DCI format may indicate that the UE does not rate match the PDSCH around the uplink subband and an associated guard band. The indication may be explicit by being included in a DCI bitfield (e.g., an indication that indicates a duplexing mode='HD' or 'SBFD', or that indicates to enable/disable rate matching around the uplink subband and guard band). For downlink reception of CSI-RS, a dedicated duplex mode (HD/FD) bitfield indicator may be included in the DCI triggering aperiodic CSI-RS or it can be configured in the information element of a triggered aperiodic CSI-RS resource. For PDSCH, the network node may dynamically indicate whether the UE does PDSCH rate matching around the uplink subband. For example, in some aspects, the network node may provide a dynamic indication to deactivate and/or disable rate matching around the uplink subband when scheduled by a DCI format 1_1 and 1_2. In some aspects, the UE may receive a MAC CE to indicate whether the UE is to enable/disable rate matching around the uplink subband and time span of the rate matching pattern.

In some aspects, for PDSCH, the indication may be implicit (e.g., a time domain resource allocation (TDRA) table may include an extra entry for a network node duplexing or duplexing mode TCI state). Based on the duplex mode, if configured as HD (non SBFD-mode), the UE doesn't rate match PDSCH around UL subband. If the duplex mode is SBFD, then the UE may expect PDSCH reception only in DL subband and rate match PDSCH around the UL subband. In some aspects, for frequency domain resource allocation (FDRA) in a DCI transmission, the UE may not ignore bitfields mapped to the uplink subband and guard band, as the corresponding resources may be considered to be valid frequency resources for downlink scheduling when the UE is indicated to receive DL reception in the UL subband.

In some aspects, SBFD symbols, based on a network node configuring non-contiguous CSI-RS or contiguous CSI-RS, may be subject to a rule defined for a UE to avoid measuring the uplink subband. With the network node scheduling downlink reception within the uplink subband in an SBFD symbol, the UE may measure the contiguous CSI-RS in all frequency resources including in the uplink subband. In some aspects, for example, a dedicated (HD/FD) bitfield indicator may be included in a scheduling DCI, a triggering DCI, and/or in RRC configuration of aperiodic CSI-RS. If the bitfield indicates an SBFD mode, then the UE may assume CSI-RS is non-contiguous and may not receive CSI-RS in the UL subband.

In some aspects, for downlink PDSCH reception and/or CSI-RS reception within an uplink subband, the scheduling offset may be larger than an application time. The application time may be the minimum required time between the received DCI (e.g., the last PDCCH symbol or last symbol in the CORESET) and a first symbol of the PDSCH/CSI-RS reception in the uplink subband. In some aspects, the application time may allow the UE to perform RF retuning and digital filter and sampling rate adaptation. In some aspects, the UE may report the application time to the network and, in some other aspects, the application time may be defined in a wireless communication standard.

Some aspects described herein for facilitating downlink reception in an uplink subband may expand the functionality of SBFD communication, thereby providing an increased uplink duty cycle (relative to full-band communication), leading to latency reduction (since it is possible to receive downlink signaling in uplink slots) and uplink coverage improvement. Furthermore, some aspects may provide enhanced system capacity, resource utilization, and spectral efficiency. Still further, some aspects may expand SBFD communications, providing for flexible and dynamic uplink/downlink resource adaptation according to uplink/downlink traffic in a robust manner.

As indicated above, FIG. 6 is provided as an example. Other examples may differ from what is described with regard to FIG. 6.

Figure 7:
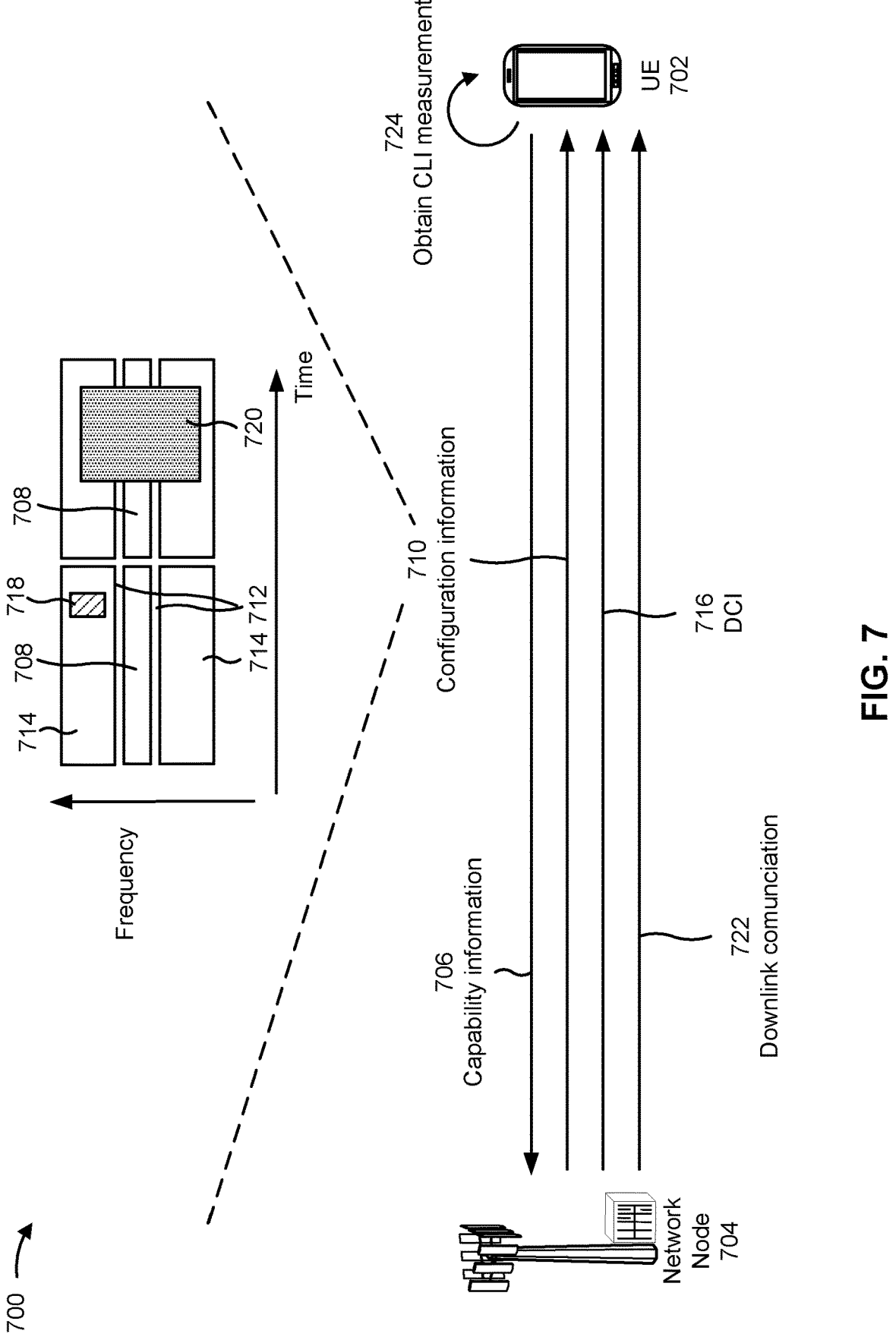
FIG. 7 is a diagram illustrating an example of downlink reception in a flexible uplink subband, in accordance with the present disclosure.

FIG. 7 is a diagram illustrating an example 700 of downlink reception in an uplink subband, in accordance with the present disclosure. As shown in FIG. 7, a UE 702 and a network node 704 may communicate with one another. The UE 702 may be, be similar to, include, or be included in, the UE1 and/or the UE2 depicted in FIG. 6, the UE 402 depicted in FIGS. 4A-4D, and/or the UE 120 depicted in FIGS. 1-3. The network node 704 may be, be similar to, include, or be included in, the network node 110 depicted in FIG. 6, the network node 404 depicted in FIGS. 4A-4D, the network node 110 depicted in FIGS. 1-2, and/or one or more components of the disaggregated base station architecture 300 depicted in FIG. 3.

As shown by reference number 706, the UE 702 may transmit, and the network node 704 may receive, capability information. The capability information may be indicative of a capability of the UE 702 for downlink reception in an uplink subband 708. In some aspects, the capability information may be indicative of a capability of the UE 702 to be scheduled for downlink reception in the uplink subband. In some aspects, the capability information may be indicative of a capability of the UE 702 to measure cross link interference based on downlink scheduling in the uplink subband 708 and a capability of the UE 702 to be scheduled for downlink reception in the uplink subband 708. In some aspects, the capability information may include a first indication that indicates the capability of the UE 702 to measure cross link interference based on downlink scheduling in the uplink subband 708 and a second indication that indicates the capability of the UE 702 to be scheduled for downlink reception in the uplink subband 708. In some aspects, the capability information may include a single indication associated with downlink reception in the uplink subband 708.

As shown by reference number 710, the network node 704 may transmit, and the UE 702 may receive, configuration information. The configuration information may be associated with downlink reception in the uplink subband 708 corresponding to an SBFD-aware configuration. In some aspects, the SBFD-aware configuration may configure one or more attributes of the uplink subband 708, one or more guard bands 712, and/or one or more downlink subbands 714, among other examples. In some aspects, the configuration information may be based on the capability information.

As shown by reference number 716, the network node 704 may transmit, and the UE 702 may receive, DCI 718. In some aspects, the DCI 718 may be received in a downlink subband 714. The DCI 718 may schedule a downlink communication 720. In some aspects, the DCI may schedule at least one of a PDSCH or a CSI-RS. In some aspects, the rate matching indication may include an explicit DCI bit-field. In some aspects, the DCI may include a rate matching indication that indicates that the UE 702 is not to rate match around at least one of the uplink subband 708 or a guard band 712 associated with the uplink subband 708. In some aspects, the rate matching indication may be received in a CSI-RS and/or a corresponding CSI-RS resource information element. In some aspects, the rate matching indication may be an implicit indication based on at least one of a TDRA or an FDRA.

As shown by reference number 722, the network node 704 may transmit, and the UE 702 may receive, a downlink communication 720 in the uplink subband 708. The downlink communication 720 may be transmitted and received based on the configuration information. In some aspects, a scheduling offset associated with the downlink reception may have a length that is greater than a length of an application time. The application time may include a minimum time period between the DCI 718 and a first symbol of the downlink communication 720.

As shown by reference number 724, the UE 702 may obtain a CLI measurement. For example, in some aspects, the UE 702 may not be capable of simultaneous CLI measurement and DL reception. Then, the UE 702 may measure the CLI in the UL subband and may not receive a DL communication in the DL subband. In some aspects, the UE 702 may be configured to measure the CLI in both the UL subband and DL subband. If the UE 702 indicates the FDM capability (CLI Reception+DL reception), the UE 702 may measure the CLI in the UL subband and simultaneously receive the DL in the DL subband.

As indicated above, FIG. 7 is provided as an example. Other examples may differ from what is described with respect to FIG. 7.

Figure 8:
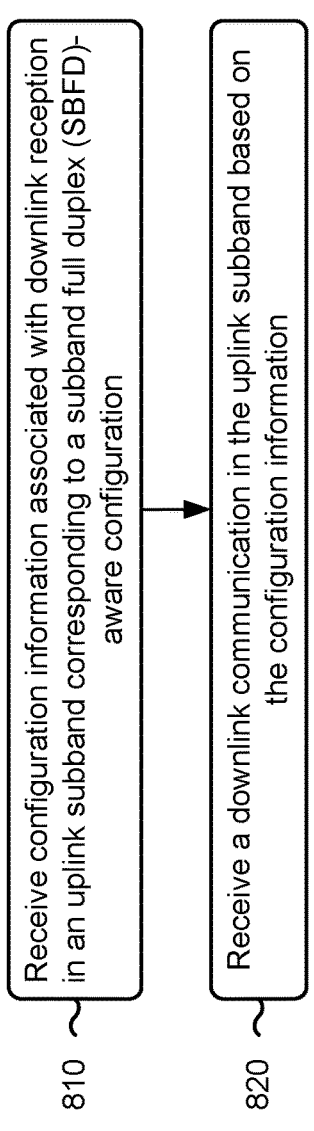
FIG. 8 is a diagram illustrating an example process performed, for example, by a UE, in accordance with the present disclosure.
Figure 8:

FIG. 8 is a diagram illustrating an example process 800 performed, for example, by a UE, in accordance with the present disclosure. Example process 800 is an example where the UE (e.g., UE 702) performs operations associated with downlink reception in an uplink subband.

As shown in FIG. 8, in some aspects, process 800 may include receiving configuration information associated with downlink reception in an uplink subband corresponding to an SBFD-aware configuration (block 810). For example, the UE (e.g., using communication manager 1008 and/or reception component 1002, depicted in FIG. 10) may receive configuration information associated with downlink reception in an uplink subband corresponding to an SBFD-aware configuration, as described above.

As further shown in FIG. 8, in some aspects, process 800 may include receiving a downlink communication in the uplink subband based on the configuration information (block 820). For example, the UE (e.g., using communication manager 1008 and/or reception component 1002, depicted in FIG. 10) may receive a downlink communication in the uplink subband based on the configuration information, as described above.

Process 800 may include additional aspects, such as any single aspect or any combination of aspects described below and/or in connection with one or more other processes described elsewhere herein.

In a first aspect, the downlink communication is associated with an inter-UE cross link interference measurement operation. In a second aspect, alone or in combination with the first aspect, the downlink communication comprises a PDSCH communication. In a third aspect, alone or in combination with one or more of the first and second aspects, the downlink communication comprises a CSI-RS. In a fourth aspect, alone or in combination with one or more of the first through third aspects, process 800 includes receiving DCI that schedules the downlink communication. In a fifth aspect, alone or in combination with one or more of the first through fourth aspects, process 800 includes receiving a rate matching indication that indicates that the UE is not to rate match the PDSCH around at least one of the uplink subband or a guard band associated with the uplink subband.

In a sixth aspect, alone or in combination with the fifth aspect, process 800 includes receiving DCI comprising the rate matching indication. In a seventh aspect, alone or in combination with the sixth aspect, the rate matching indication comprises an explicit DCI bitfield. In some aspects, the DCI bitfield indicates a set of symbols as SBFD symbols or non-SBFD symbols. In some aspects, the DCI bitfield activates or deactivates rate matching around the at least one of the uplink subband or the guard band. In an eighth aspect, alone or in combination with one or more of the sixth through seventh aspects, the DCI schedules at least one of a PDSCH or a CSI-RS. In a ninth aspect, alone or in combination with one or more of the fifth through eighth aspects, process 800 includes receiving a channel state information reference signal (CSI-RS) corresponding to a CSI-RS resource information element that includes an indicator of a duplexing mode.

In a tenth aspect, alone or in combination with one or more of the fifth through ninth aspects, the rate matching indication is an implicit indication based on a time domain resource allocation. In some aspects, process 800 includes determine, based on a frequency domain resource allocation, that a set of frequency resources corresponding to the at least one of the uplink subband or the guard band are available frequency resources for the downlink communication. In an eleventh aspect, alone or in combination with one or more of the first through tenth aspects, a scheduling offset associated with the downlink reception has a length that is greater than or equal to a length of an application time, wherein the application time comprises a minimum time period between a downlink control information and a first symbol of the downlink communication.

In a twelfth aspect, alone or in combination with one or more of the first through eleventh aspects, the UE is not capable of simultaneous cross link interference (CLI) measurement in the uplink subband and a downlink subband, and process 800 includes obtaining a CLI measurement in an uplink-only subband or a downlink and uplink subband. In a thirteenth aspect, alone or in combination with one or more of the first through twelfth aspects, the UE is capable of simultaneous CLI measurement in the uplink subband and a downlink subband, and process 800 includes obtaining a first CLI measurement associated with the downlink communication in the uplink subband and obtaining a second CLI measurement associated with an additional communication in a downlink subband.

In a fourteenth aspect, alone or in combination with one or more of the first through thirteenth aspects, process 800 includes transmitting capability information indicative of a capability of the UE for downlink reception in the uplink subband, wherein the configuration information is based on the capability information. In a fifteenth aspect, alone or in combination with one or more of the first through fourteenth aspects, process 800 includes transmitting capability information indicative of a capability of the UE to be scheduled for downlink reception in the uplink subband, and receiving, based on the capability information, downlink control information that schedules the downlink communication. In a sixteenth aspect, alone or in combination with one or more of the first through fifteenth aspects, process 800 includes transmitting capability information indicative of a capability of the UE to measure cross link interference in the uplink subband and a capability of the UE to be scheduled for downlink reception in the uplink subband, wherein the configuration information is based on the capability information, and receiving, based on the capability information, downlink control information that schedules the downlink communication. In a seventeenth aspect, alone or in combination with the sixteenth aspect, the capability information includes a first indication that indicates the capability of the UE to measure cross link interference in the uplink subband and a second indication that indicates the capability of the UE to be scheduled for downlink reception in the uplink subband. In an eighteenth aspect, alone or in combination with the sixteenth aspect, the capability information includes a single indication associated with downlink reception in the uplink subband.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
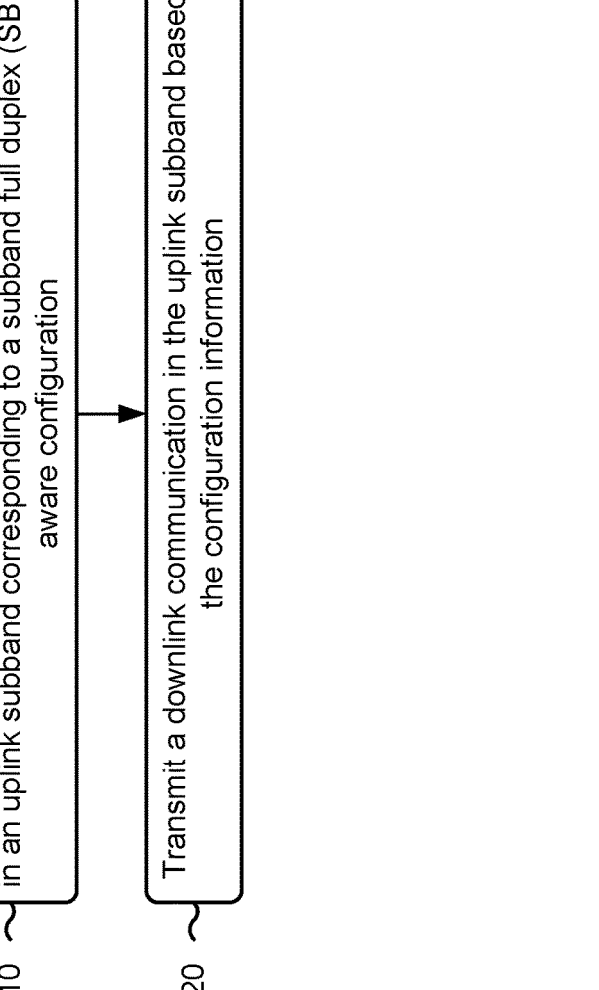
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 704) performs operations associated with downlink reception in an uplink subband.

As shown in FIG. 9, in some aspects, process 900 may include transmitting configuration information associated with downlink reception in an uplink subband corresponding to an SBFD-aware configuration (block 910). For example, the network node (e.g., using communication manager 1108 and/or transmission component 1104, depicted in FIG. 11) may transmit configuration information associated with downlink reception in an uplink subband corresponding to an SBFD-aware configuration, as described above.

As further shown in FIG. 9, in some aspects, process 900 may include transmitting a downlink communication in the uplink subband based on the configuration information (block 920). For example, the network node (e.g., using communication manager 1108 and/or transmission component 1104, depicted in FIG. 11) may transmit a downlink communication in the uplink subband based on the configuration information, as described above.

Process 900 may include additional aspects, such as any single aspect or any combination of aspects described below and/or in connection with one or more other processes described elsewhere herein.

In a first aspect, the downlink communication is associated with an inter-UE cross link interference measurement operation. In a second aspect, alone or in combination with the first aspect, the downlink communication comprises a physical downlink shared channel communication. In a third aspect, alone or in combination with one or more of the first and second aspects, the downlink communication comprises a channel state information reference signal. In a fourth aspect, alone or in combination with one or more of the first through third aspects, process 900 includes transmitting DCI that schedules the downlink communication.

In a fifth aspect, alone or in combination with one or more of the first through fourth aspects, process 900 includes transmitting a rate matching indication that indicates that the UE is not to rate match the PDSCH around at least one of the uplink subband or a guard band associated with the uplink subband. In a sixth aspect, alone or in combination with the fifth aspect, process 900 includes transmitting DCI comprising the rate matching indication. In a seventh aspect, alone or in combination with the sixth aspect, the rate matching indication comprises an explicit DCI bitfield. In some aspects, the DCI bitfield indicates a set of symbols as SBFD symbols or non-SBFD symbols. In some aspects, the DCI bitfield activates or deactivates rate matching around the at least one of the uplink subband or the guard band. In an eighth aspect, alone or in combination with one or more of the sixth through seventh aspects, the DCI schedules at least one of a physical downlink shared channel or a channel state information reference signal. In a ninth aspect, alone or in combination with one or more of the fifth through eighth aspects, process 900 includes transmitting a CSI-RS corresponding to a CSI-RS resource information element includes an indicator of a duplexing mode. In a tenth aspect, alone or in combination with one or more of the fifth through ninth aspects, the rate matching indication is an implicit indication based on a time domain resource allocation.

In an eleventh aspect, alone or in combination with one or more of the first through tenth aspects, a scheduling offset associated with the downlink reception has a length that is greater than a length of an application time, wherein the application time comprises a minimum time period between a downlink control information and a first symbol of the downlink communication. In a twelfth aspect, alone or in combination with one or more of the first through eleventh aspects, the UE is not capable of simultaneous CLI measurement and downlink reception, wherein the downlink communication is associated with a CLI measurement in an uplink-only subband or a downlink and uplink subband. In a thirteenth aspect, alone or in combination with one or more of the first through twelfth aspects, the UE is capable of simultaneous CLI measurement and downlink reception, wherein process 900 includes receiving an additional communication in a downlink subband.

In a fourteenth aspect, alone or in combination with one or more of the first through thirteenth aspects, process 900 includes receiving capability information indicative of a capability of the UE for downlink reception in the uplink subband, wherein the configuration information is based on the capability information. In a fifteenth aspect, alone or in combination with one or more of the first through fourteenth aspects, process 900 includes receiving capability information indicative of a capability of the UE to be scheduled for downlink reception in the uplink subband, and transmitting, based on the capability information, downlink control information that schedules the downlink communication. In a sixteenth aspect, alone or in combination with one or more of the first through fifteenth aspects, process 900 includes receiving capability information indicative of a capability of the UE to measure cross link interference based on downlink scheduling in the uplink subband and a capability of the UE to be scheduled for downlink reception in the uplink subband, wherein the configuration information is based on the capability information, and transmitting, based on the capability information, downlink control information that schedules the downlink communication. In a seventeenth aspect, alone or in combination with the sixteenth aspect, the capability information includes a first indication that indicates the capability of the UE to measure cross link interference based on downlink scheduling in the uplink subband and a second indication that indicates the capability of the UE to be scheduled for downlink reception in the uplink subband. In an eighteenth aspect, alone or in combination with the sixteenth aspect, the capability information includes a single indication associated with downlink reception in the uplink subband.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
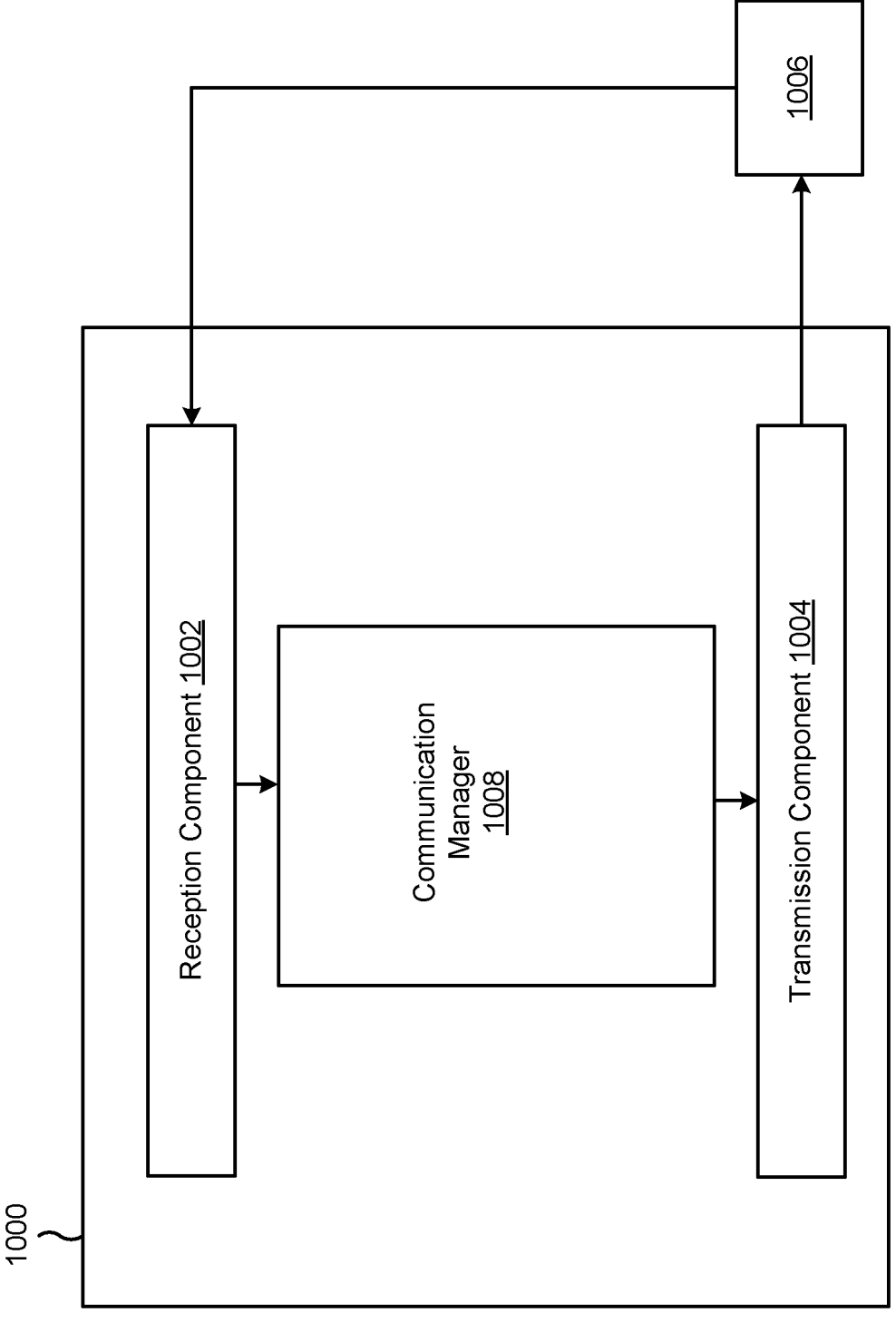
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

In some examples, means for transmitting, outputting, or sending (or means for outputting for transmission) may include one or more antennas, a modulator, a transmit MIMO processor, a transmit processor, or a combination thereof, of the UE described above in connection with FIG. 2.

In some examples, means for receiving (or means for obtaining) may include one or more antennas, a demodulator, a MIMO detector, a receive processor, or a combination thereof, of the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

The communication manager 1008 and/or the reception component 1002 may receive configuration information associated with downlink reception in an uplink subband corresponding to a subband full duplex (SBFD)-aware configuration. In some aspects, the communication manager 1008 may include one or more antennas, a modem, a controller/processor, a memory, or a combination thereof, of the UE described in connection with FIG. 2. In some aspects, the communication manager 1008 may include the reception component 1002 and/or the transmission component 1004. In some aspects, the communication manager 1008 may be, be similar to, include, or be included in, the communication manager 140 depicted in FIGS. 1 and 2.

The communication manager 1008 and/or the reception component 1002 may receive a downlink communication in the flexible uplink subband based on the configuration information. The communication manager 1008 and/or the reception component 1002 may receive DCI that schedules the downlink communication. The communication manager 1008 and/or the reception component 1002 may receive a rate matching indication that indicates that the UE is not to rate match around at least one of the uplink subband or a guard band associated with the uplink subband. The communication manager 1008 and/or the reception component 1002 may receive DCI comprising the rate matching indication. The communication manager 1008 and/or the reception component 1002 may receive a CSI-RS corresponding to a CSI-RS resource information element includes the rate matching indication.

The communication manager 1008 and/or the transmission component 1004 may transmit capability information indicative of a capability of the UE for downlink reception in the uplink subband, wherein the configuration information is based on the capability information. The communication manager 1008 and/or the transmission component 1004 may transmit capability information indicative of a capability of the UE to be scheduled for downlink reception in the uplink subband. The communication manager 1008 and/or the reception component 1002 may receive, based on the capability information, downlink control information that schedules the downlink communication. The communication manager 1008 and/or the transmission component 1004 may transmit capability information indicative of a capability of the UE to measure cross link interference based on downlink scheduling in the uplink subband and a capability of the UE to be scheduled for downlink reception in the uplink subband, wherein the configuration information is based on the capability information. The communication manager 1008 and/or the reception component 1002 may receive, based on the capability information, downlink control information that schedules the downlink communication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
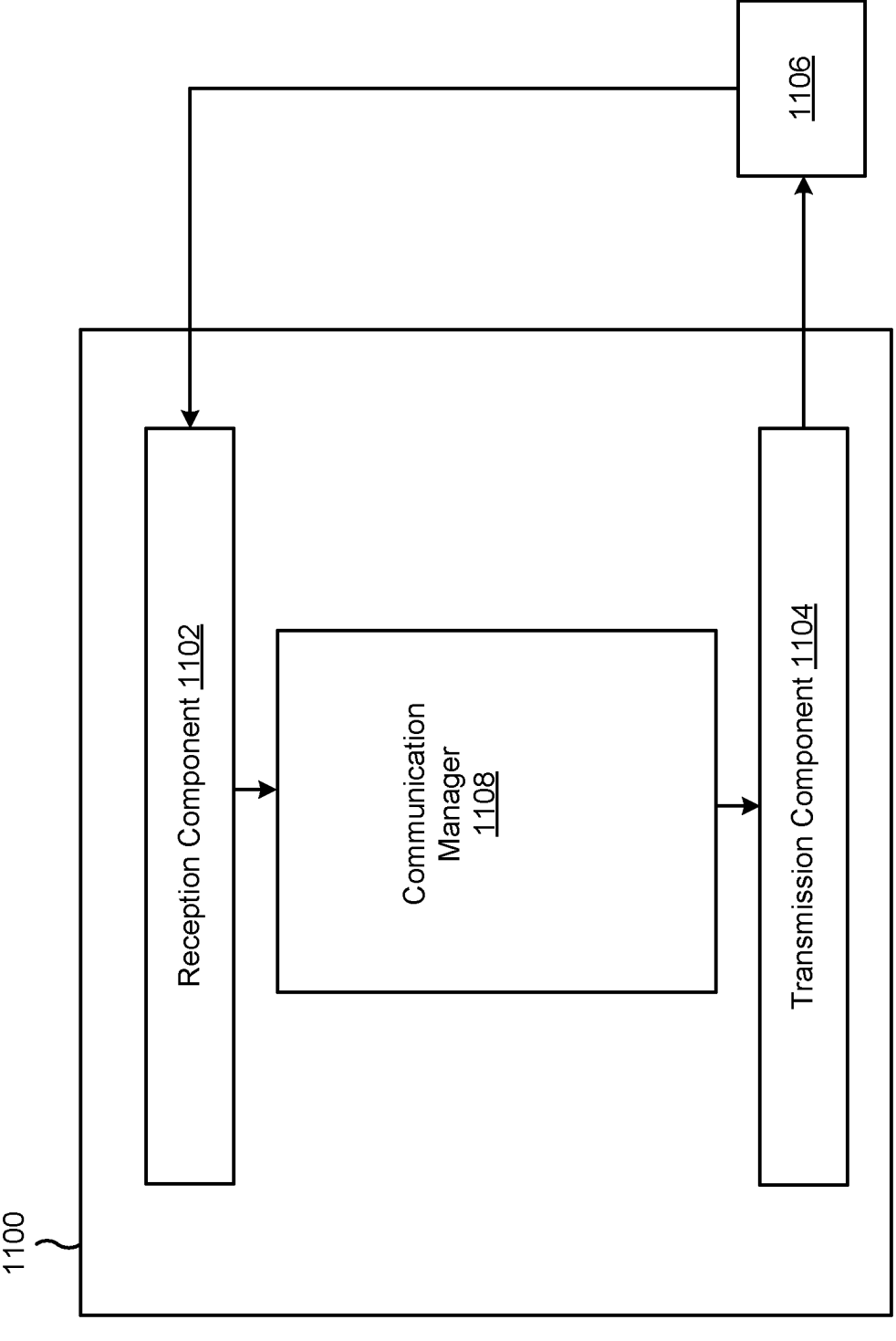
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

In some examples, means for transmitting, outputting, or sending (or means for outputting for transmission) may include one or more antennas, a modulator, a transmit MIMO processor, a transmit processor, or a combination thereof, of the network node described above in connection with FIG. 2.

In some examples, means for receiving (or means for obtaining) may include one or more antennas, a demodulator, a MIMO detector, a receive processor, or a combination thereof, of the network node described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

The communication manager 1108 and/or the transmission component 1104 may transmit configuration information associated with downlink reception in an uplink subband corresponding to an SBFD-aware configuration. In some aspects, the communication manager 1108 may include one or more antennas, a modem, a controller/processor, a memory, or a combination thereof, of the network node described in connection with FIG. 2. In some aspects, the communication manager 1108 may include the reception component 1102 and/or the transmission component 1104. In some aspects, the communication manager 1108 may be, be similar to, include, or be included in, the communication manager 150 depicted in FIGS. 1 and 2.

The communication manager 1108 and/or the transmission component 1104 may transmit a downlink communication in the uplink subband based on the configuration information. The communication manager 1108 and/or the transmission component 1104 may transmit DCI that schedules the downlink communication. The communication manager 1108 and/or the transmission component 1104 may transmit a rate matching indication that indicates that the UE is not to rate match around at least one of the uplink subband or a guard band associated with the uplink subband. The communication manager 1108 and/or the transmission component 1104 may transmit DCI comprising the rate matching indication. The communication manager 1108 and/or the transmission component 1104 may transmit a CSI-RS corresponding to a CSI-RS resource information element includes the rate matching indication.

The communication manager 1108 and/or the reception component 1102 may receive capability information indicative of a capability of the UE for downlink reception in the uplink subband, wherein the configuration information is based on the capability information. The communication manager 1108 and/or the reception component 1102 may receive capability information indicative of a capability of the UE to be scheduled for downlink reception in the uplink subband. The communication manager 1108 and/or the transmission component 1104 may transmit, based on the capability information, downlink control information that schedules the downlink communication. The communication manager 1108 and/or the reception component 1102 may receive capability information indicative of a capability of the UE to measure cross link interference based on downlink scheduling in the uplink subband and a capability of the UE to be scheduled for downlink reception in the uplink subband, wherein the configuration information is based on the capability information. The communication manager 1108 and/or the transmission component 1104 may transmit, based on the capability information, downlink control information that schedules the downlink communication.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by an apparatus at a user equipment (UE), comprising: receiving configuration information associated with downlink reception in an uplink subband corresponding to a subband full duplex (SBFD)-aware configuration; and receiving a downlink communication in the uplink subband based on the configuration information.

Aspect 2: The method of Aspect 1, wherein the downlink communication is associated with an inter-UE cross link interference (CLI) measurement operation.

Aspect 3: The method of either of Aspects 1 or 2, wherein the downlink communication comprises a physical downlink shared channel (PDSCH) communication.

Aspect 4: The method of any of Aspects 1-3, wherein the downlink communication comprises a channel state information reference signal (CSI-RS).

Aspect 5: The method of any of Aspects 1-4, further comprising receiving downlink control information (DCI) that schedules the downlink communication.

Aspect 6: The method of any of Aspects 1-5, wherein the downlink communication comprises a physical downlink shared channel (PDSCH) communication, the method further comprising receiving a rate matching indication that indicates that the UE is not to rate match the PDSCH around at least one of the uplink subband or a guard band associated with the uplink subband.

Aspect 7: The method of Aspect 6, further comprising receiving downlink control information (DCI) comprising the rate matching indication.

Aspect 8: The method of Aspect 7, wherein the rate matching indication comprises an explicit DCI bitfield.

Aspect 9: The method of Aspect 8, wherein the DCI bitfield indicates a set of symbols as SBFD symbols or non-SBFD symbols.

Aspect 10: The method of either of Aspects 8 or 9, wherein the DCI bitfield activates or deactivates rate matching around the at least one of the uplink subband or the guard band.

Aspect 11: The method of any of Aspects 7-10, wherein the DCI schedules at least one of a physical downlink shared channel or a channel state information reference signal.

Aspect 12: The method of any of Aspects 6-11, further comprising receiving a channel state information reference signal (CSI-RS) corresponding to a CSI-RS resource information element includes an indicator of a duplexing mode.

Aspect 13: The method of any of Aspects 6-12, wherein the rate matching indication is an implicit indication based on a time domain resource allocation.

Aspect 14: The method of any of Aspects 6-13, further comprising determining, based on a frequency domain resource allocation, that a set of frequency resources corresponding to the at least one of the uplink subband or the guard band are available frequency resources for the downlink communication.

Aspect 15: The method of any of Aspects 6-14, wherein a scheduling offset associated with the downlink reception has a length that is greater than or equal to a length of an application time, wherein the application time comprises a minimum time period between a downlink control information and a first symbol of the downlink communication.

Aspect 16: The method of any of Aspects 1-15, wherein the UE is not capable of simultaneous cross link interference (CLI) measurement uplink and downlink reception, the method further comprising obtaining a CLI measurement in an uplink-only subband or a downlink and uplink subband.

Aspect 17: The method of any of Aspects 1-15, wherein the UE is capable of simultaneous cross link interference (CLI) measurement and downlink reception, the method further comprising obtaining a CLI measurement in the uplink subband and receiving a downlink communication in a downlink subband.

Aspect 18: The method of any of Aspects 1-17, further comprising transmitting capability information indicative of a capability of the UE for downlink reception in the uplink subband, wherein the configuration information is based on the capability information.

Aspect 19: The method of any of Aspects 1-18, further comprising: transmitting capability information indicative of a capability of the UE to be scheduled for downlink reception in the uplink subband; and receiving, based on the capability information, downlink control information that schedules the downlink communication.

Aspect 20: The method of any of Aspects 1-19, further comprising: transmitting capability information indicative of a capability of the UE to measure cross link interference in the uplink subband and a capability of the UE to be scheduled for downlink reception in the uplink subband, wherein the configuration information is based on the capability information; and receiving, based on the capability information, downlink control information that schedules the downlink communication.

Aspect 21: The method of Aspect 20, wherein the capability information includes a first indication that indicates the capability of the UE to measure cross link interference in the uplink subband and a second indication that indicates the capability of the UE to be scheduled for downlink reception in the uplink subband.

Aspect 22: The method of Aspect 20, wherein the capability information includes a single indication associated with downlink reception in the uplink subband.

Aspect 23: A method of wireless communication performed by an apparatus at a network node, comprising: transmitting configuration information associated with downlink reception in an uplink subband corresponding to a subband full duplex (SBFD)-aware configuration; and transmitting a downlink communication in the uplink subband based on the configuration information.

Aspect 24: The method of Aspect 23, wherein the downlink communication is associated with an inter-UE cross link interference (CLI) measurement operation.

Aspect 25: The method of either of Aspects 23 or 24, wherein the downlink communication comprises a physical downlink shared channel (PDSCH) communication.

Aspect 26: The method of any of Aspects 23-25, wherein the downlink communication comprises a channel state information reference signal (CSI-RS).

Aspect 27: The method of any of Aspects 23-26, further comprising transmitting downlink control information (DCI) that schedules the downlink communication.

Aspect 28: The method of any of Aspects 23-27, wherein the downlink communication comprises a physical downlink shared channel (PDSCH) communication, the method further comprising transmitting a rate matching indication that indicates that the UE is not to rate match the PDSCH around at least one of the uplink subband or a guard band associated with the uplink subband.

Aspect 29: The method of Aspect 28, further comprising transmitting downlink control information (DCI) comprising the rate matching indication.

Aspect 30: The method of Aspect 29, wherein the rate matching indication comprises an explicit DCI bitfield.

Aspect 33: The method of any of Aspects 29-32, wherein the DCI schedules at least one of a physical downlink shared channel or a channel state information reference signal.

Aspect 34: The method of any of Aspects 28-33, further comprising transmitting a channel state information reference signal (CSI-RS) corresponding to a CSI-RS resource information element includes an indicator of a duplexing mode.

Aspect 35: The method of any of Aspects 28-34, wherein the rate matching indication is an implicit indication based on a time domain resource allocation.

Aspect 36: The method of any of Aspects 23-35, wherein a scheduling offset associated with the downlink reception has a length that is greater than or equal to a length of an application time, wherein the application time comprises a minimum time period between a downlink control information and a first symbol of the downlink communication.

Aspect 37: The method of any of Aspects 23-36, wherein the UE is not capable of simultaneous cross link interference (CLI) measurement and downlink reception, wherein the downlink communication is associated with a CLI measurement in an uplink-only subband or a downlink and uplink subband.

Aspect 38: The method of any of Aspects 23-36, wherein the UE is capable of simultaneous cross link interference (CLI) measurement and downlink reception, wherein the downlink communication is associated with a CLI measurement in the uplink subband, the method further comprising transmitting an additional communication in a downlink subband.

Aspect 39: The method of any of Aspects 23-38, further comprising receiving capability information indicative of a capability of the UE for downlink reception in the uplink subband, wherein the configuration information is based on the capability information.

Aspect 40: The method of any of Aspects 23-39, further comprising: receiving capability information indicative of a capability of the UE to be scheduled for downlink reception in the uplink subband; and transmitting, based on the capability information, downlink control information that schedules the downlink communication.

Aspect 41: The method of any of Aspects 23-40, further comprising: receiving capability information indicative of a capability of the UE to measure cross link interference in the uplink subband and a capability of the UE to be scheduled for downlink reception in the uplink subband, wherein the configuration information is based on the capability information; and transmitting, based on the capability information, downlink control information that schedules the downlink communication.

Aspect 42: The method of Aspect 41, wherein the capability information includes a first indication that indicates the capability of the UE to measure cross link interference in the uplink subband and a second indication that indicates the capability of the UE to be scheduled for downlink reception in the uplink subband.

Aspect 43: The method of Aspect 41, wherein the capability information includes a single indication associated with downlink reception in the uplink subband.

Aspect 44: An apparatus for wireless communication at a device, comprising a processor; memory coupled with the processor; and instructions stored in the memory and executable by the processor to cause the apparatus to perform the method of one or more of Aspects 1-22.

Aspect 45: A device for wireless communication, comprising a memory and one or more processors coupled to the memory, the one or more processors configured to perform the method of one or more of Aspects 1-22.

Aspect 46: An apparatus for wireless communication, comprising at least one means for performing the method of one or more of Aspects 1-22.

Aspect 47: A non-transitory computer-readable medium storing code for wireless communication, the code comprising instructions executable by a processor to perform the method of one or more of Aspects 1-22.

Aspect 48: A non-transitory computer-readable medium storing a set of instructions for wireless communication, the set of instructions comprising one or more instructions that, when executed by one or more processors of a device, cause the device to perform the method of one or more of Aspects 1-22.

Aspect 49: An apparatus for wireless communication at a device, comprising a processor; memory coupled with the processor; and instructions stored in the memory and executable by the processor to cause the apparatus to perform the method of one or more of Aspects 23-43.

Aspect 50: A device for wireless communication, comprising a memory and one or more processors coupled to the memory, the one or more processors configured to perform the method of one or more of Aspects 23-43.

Aspect 51: An apparatus for wireless communication, comprising at least one means for performing the method of one or more of Aspects 23-43.

Aspect 52: A non-transitory computer-readable medium storing code for wireless communication, the code comprising instructions executable by a processor to perform the method of one or more of Aspects 23-43.

Aspect 53: A non-transitory computer-readable medium storing a set of instructions for wireless communication, the set of instructions comprising one or more instructions that, when executed by one or more processors of a device, cause the device to perform the method of one or more of Aspects 23-43.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories and configured to cause the UE to:
     receive configuration information associated with downlink reception in an uplink subband corresponding to a subband full duplex (SBFD)-aware configuration; and
     receive a downlink communication in the uplink subband based on the configuration information.

2. The UE of claim 1, wherein the downlink communication is associated with an inter-UE cross link interference (CLI) measurement operation.

3. The UE of claim 1, wherein the downlink communication comprises a physical downlink shared channel (PDSCH) communication.

4. The UE of claim 1, wherein the downlink communication comprises a channel state information reference signal (CSI-RS).

5. The UE of claim 1, wherein the one or more processors are further configured to cause the UE to receive downlink control information (DCI) that schedules the downlink communication.

6. The UE of claim 1, wherein the downlink communication comprises a physical downlink shared channel (PDSCH) communication, wherein the one or more processors are further configured to cause the UE to receive a rate matching indication that indicates that the UE is not to rate match the PDSCH around at least one of the uplink subband or a guard band associated with the uplink subband.

7. The UE of claim 6, wherein the one or more processors are further configured to cause the UE to receive downlink control information (DCI) comprising the rate matching indication.

8. The UE of claim 7, wherein the rate matching indication comprises an explicit DCI bitfield.

9. The UE of claim 8, wherein the DCI bitfield indicates a set of symbols as SBFD symbols or non-SBFD symbols.

10. The UE of claim 8, wherein the DCI bitfield activates or deactivates rate matching around the at least one of the uplink subband or the guard band.

11. The UE of claim 7, wherein the DCI schedules at least one of a physical downlink shared channel or a channel state information reference signal.

12. The UE of claim 6, wherein the one or more processors are further configured to cause the UE to receive a channel state information reference signal (CSI-RS) corresponding to a CSI-RS resource information element includes an indicator of a duplexing mode.

13. The UE of claim 6, wherein the rate matching indication is an implicit indication based on a time domain resource allocation.

14. The UE of claim 6, wherein the one or more processors are further configured to cause the UE to determine, based on a frequency domain resource allocation, that a set of frequency resources corresponding to the at least one of the uplink subband or the guard band are available frequency resources for the downlink communication.

15. The UE of claim 1, wherein a scheduling offset associated with the downlink reception has a length that is greater than or equal to a length of an application time, wherein the application time comprises a minimum time period between a downlink control information and a first symbol of the downlink communication.

16. The UE of claim 1, wherein the UE is not capable of simultaneous cross link interference (CLI) measurement and downlink reception, and wherein the one or more processors are further configured to cause the UE to obtain a CLI measurement in an uplink-only subband or a downlink and uplink subband.

17. The UE of claim 1, wherein the UE is capable of simultaneous cross link interference (CLI) measurement and downlink reception, and wherein the one or more processors are further configured to cause the UE to obtain a CLI measurement in the uplink subband and receive a downlink communication in a downlink subband.

18. The UE of claim 1, wherein the one or more processors are further configured to cause the UE to transmit capability information indicative of a capability of the UE for downlink reception in the uplink subband, wherein the configuration information is based on the capability information.

19. The UE of claim 1, wherein the one or more processors are further configured to cause the UE to:
   transmit capability information indicative of a capability of the UE to be scheduled for downlink reception in the uplink subband; and
   receive, based on the capability information, downlink control information that schedules the downlink communication.

20. The UE of claim 1, wherein the one or more processors are further configured to cause the UE to:
   transmit capability information indicative of a capability of the UE to measure cross link interference in the uplink subband and a capability of the UE to be scheduled for downlink reception in the uplink subband, wherein the configuration information is based on the capability information; and
   receive, based on the capability information, downlink control information that schedules the downlink communication.

21. The UE of claim 20, wherein the capability information includes a first indication that indicates the capability of the UE to measure cross link interference in the uplink subband and a second indication that indicates the capability of the UE to be scheduled for downlink reception in the uplink subband.

22. The UE of claim 20, wherein the capability information includes a single indication associated with downlink reception in the uplink subband.

23. A network node for wireless communication, comprising:
   one or more memories; and
   one or more processors coupled to the one or more memories and configured to cause the network node to:

transmit, to a user equipment (UE), configuration information associated with downlink reception in an uplink subband corresponding to a subband full duplex (SBFD)-aware configuration; and transmit a downlink communication in the uplink subband based on the configuration information.

24. The network node of claim 23, wherein a scheduling offset associated with the downlink reception has a length that is greater than or equal to a length of an application time, wherein the application time comprises a minimum time period between a downlink control information and a first symbol of the downlink communication.

25. The network node of claim 23, wherein the UE is capable of simultaneous cross link interference (CLI) measurement and downlink reception, wherein the downlink communication is associated with a CLI measurement in the uplink subband, and wherein the one or more processors are configured to transmit an additional communication in a downlink subband.

26. The network node of claim 23, wherein the one or more processors are further configured to cause the network node to receive capability information indicative of a capability of the UE for downlink reception in the uplink subband, wherein the configuration information is based on the capability information.

27. A method of wireless communication performed by an apparatus at a user equipment (UE), comprising:

receiving configuration information associated with downlink reception in an uplink subband corresponding to a subband full duplex (SBFD)-aware configuration; and receiving a downlink communication in the uplink subband based on the configuration information.

28. The method of claim 27, wherein a scheduling offset associated with the downlink reception has a length that is greater than or equal to a length of an application time, wherein the application time comprises a minimum time period between a downlink control information and a first symbol of the downlink communication.

29. A method of wireless communication performed by an apparatus at a network node, comprising:

transmitting configuration information associated with downlink reception in an uplink subband corresponding to a subband full duplex (SBFD)-aware configuration; and transmitting a downlink communication in the uplink subband based on the configuration information.

30. The method of claim 29, wherein a scheduling offset associated with the downlink reception has a length that is greater than or equal to a length of an application time, wherein the application time comprises a minimum time period between a downlink control information and a first symbol of the downlink communication.

* * * * *